United States Patent Office 2,877,267
Patented Mar. 10, 1959

2,877,267

POLYFLUORINATED SULFONIC ACIDS AND DERIVATIVES

George Van Dyke Tiers and Robert J. Koshar, St. Paul, Minn., assignors to Minnesota Mining and Manufacturing Company, St. Paul, Minn., a corporation of Delaware No Drawing. Application June 18, 1956
Serial No. 591,811

2 Claims. (Cl. 260—543)

The present invention relates to a new and useful class of reactive fluorocarbon compounds and more particularly relates to a new class of fluorocarbon compounds comprising the omega-chloro-perfluoroalkanesulfonyl fluorides and derivatives.

The novel omega-chloro-perfluoroalkanesulfonyl fluorides of the invention correspond to the formula $$Cl(C_2F_4)_nSO_2F$$

wherein $n$ is an integer of from 2 to about 150.

These sulfonyl fluorides provide useful starting compounds from which the acids and other sulfonyl compounds can be made. The perfluoromethylene (—$CF_2$—) groups linked together impart a highly stable and inert structure to the molecule. In addition these perfluoro groups provide a highly fluorinated "tail" which is both oleophobic and hydrophobic to a marked degree and which imparts marked surface activity to the molecule. Both water solubility and oil solubility increase as the number of perfluoromethylene groups decreases.

The terminal chlorine atom on the end of the "tail" provides higher boiling (and thus less volatile) compounds more soluble in hydrocarbon solvents than their completely fluorinated analogs, some of which are disclosed and claimed in U. S. Patent 2,732,398 to Brice and Trott. The presence of the terminal chlorine atom on the otherwise perfluorinated "tail" makes the present compounds useful in applications, such as surface active agents in aqueous or organic solutions, where the higher volatility and/or lower solubility of the corresponding completely fluorinated compounds render them unsuitable.

The fluorosulfonyl group (—$SO_2F$) forms a reactive inorganic "head" for the molecule, the sulfur atom being united directly with the terminal perfluoromethylene group at the "head" end of the omega-chloro-perfluoroalkyl tail, and further linked to two oxygen atoms. The fluorine atom of the fluorosulfonyl group provides a reactive site for the attachment of other groups to the sulfur atom in the formation of acids and other derivatives.

The omega-chloro-perfluoroalkanesulfonyl fluorides are readily prepared by reacting tetrafluoroethylene ($CF_2=CF_2$) with sulfuryl chlorofluoride ($SO_2FCl$) in the presence of an initiator for free radical polymerization at a temperature of —100° C. to 250° C., the reaction proceeding generally as illustrated by the reaction equation:

$$SO_2FCl + n(CF_2=CF_2) \xrightarrow{catalyst} Cl(CF_2CF_2)_nSO_2F$$

The choice of initiator for free radical polymerization is one of convenience and suitable initiators are, for example, actinic radiation such as ultraviolet light, an organic peroxide or hydroperoxide, or an aliphatic azo compound. This particular process by means of which these novel omega-chloro-perfluoroalkanesulfonyl fluorides are made is more completely set forth and claimed in the companion application of George Van Dyke Tiers, one of the co-inventors in this case, entitled "Process for Making Organic Sulfonyl Fluorides," Serial No. 595,013, filed on even date herewith.

Preparation of the novel compounds of this invention in accordance with the process described in the aforementioned companion application is illustrated in the specific examples which follow.

Example 1

In a 180 ml. autoclave was placed 40 g. $SO_2FCl$, 5.2 g. $C_2F_4$ (mol ratio 7:1) and 0.7 g. di-tertiary-butyl peroxide (DTBP). The autoclave was sealed, and heated to 140–145° C. for 15 hours. The autoclave was then vented and a waxy dark brown solid recovered. The solid, after heating to 30° C. in vacuo to remove any DTBP decomposition products, showed an infrared band for —$SO_2F$ absorption at 6.8$\mu$. The average value of $n$ in the formula $Cl(C_2F_4)_nSO_2F$ was determined to be between 4 and 5 (approximately 4.5) by quantitative analysis.

|  | Percent S | Percent Cl |
|---|---|---|
| Calcd. for Cl $(C_2F_4)_4SO_2F$ | 6.17 | 6.85 |
| Found | 5.53 | 6.7 |
| Calcd. for Cl $(C_2F_4)_5SO_2F$ | 5.17 | 5.7 |

Example 2

In a 180 ml. stainless steel autoclave was placed 59 g. $SO_2FCl$, 21.4 g. $C_2F_4$ (mol ratio 2.38:1) and 8.7 g. of ditertiary-butyl peroxide. The autoclave was sealed and heated at 140–145° C. for 16 hours with constant shaking. The autoclave was vented at room temperature and there was recovered 19.5 g. of solid product. Upon heating in a sublimator at from 85–200° C., the solid reduced to a liquid fraction, two waxy sublimates and a powdery residue, all of which showed an infrared absorption band at 6.83–6.87$\mu$, which is characteristic of —$SO_2F$ absorption in perhaloalkyl sulfonyl fluorides. No elemental analysis of the liquid fraction was made because of the presence of infrared absorption characteristic of hydrogen-containing impurities. The elemental analyses of the waxy sublimates and powdery residue, representing a yield, based on starting $C_2F_4$, of about 63%, was as follows:

|  | Calc'd | Found |
|---|---|---|
| (1) Waxy sublimate, M. P. 115–135° C.: | | |
| Cl $(C_2F_4)_8SO_2F$ _____ Percent S___ | 3.48 | 3.29 |
| Cl $(C_2F_4)_9SO_2F$ _____ Percent S___ | 3.15 | |
| (2) Waxy sublimate, M. P. 165–180° C.: | | |
| Cl $(C_2F_4)_{12}SO_2F$ _____ Percent S___ | 2.43 | 2.43 |
| (3) Powdery residue: | | |
| Cl $(C_2F_4)_{52}SO_2F$ _____ Percent S___ | 0.60 | 0.59 |
| _____ Percent Cl__ | 0.67 | 0.68 |

As in apparent from the examples, the predominance of fractions having large or small average values of $n$ in the general formula $Cl(C_2F_4)_nSO_2F$ may be controlled by varying the molar ratio of the reactants to one another. Molar ratios of $SO_2FCl$ to $CF_2=CF_2$ of from 5:1 to 50:1, for example, favor the production of compounds having $n$ values which may range from 2 to about 50. Molar ratios of $SO_2FCl$ to $CF_2=CF_2$ of from 1:10 to 4:1, for example, favor the production of compounds having average $n$ values which may run from about 50 to 150. Larger or smaller molar ratios than those mentioned do not adversely affect the reaction, however, and the indicated molar ratios are given primarily as a practical rule of thumb.

The omega-chloro-perfluoroalkanesulfonyl fluorides are useful intermediates in the preparation of a wide variety of fluorinated organic compounds and provide novel starting compounds from which the corresponding sulfonic acids, metal and ammonium salts, acid chlorides and sulfonamides, as well as other derivatives may be prepared.

The following example illustrates the preparation of the calcium salt and other derivatives from the omega-chloro-perfluoroalkanesulfonyl fluoride compound of Example 1, which compound is hereinafter represented for convenience by the formula $Cl(C_2F_4)_{4.5}SO_2F$.

*Example 3*

A sealed ampoule of 10 ml. capacity, containing 2 ml. $H_2O$, 67 mg. CaO (20% excess based on the weight of $Cl(C_2F_4)_{4.5}SO_2F$) and 566 mg. $Cl(C_2F_4)_{4.5}SO_2F$, is heated to 100° C. with agitation for four hours, cooled, and opened, the reaction proceeding generally as illustrated by the reaction equation:

$$2Cl(C_2F_4)_{4.5}SO_2F + 2Ca(OH)_2 \rightarrow$$
$$[Cl(C_2F_4)_{4.5}SO_3]_2Ca + CaF_2 + 2H_2O$$

To convert unreacted calcium hydroxide to insoluble $CaCO_3$, carbon dioxide is bubbled into the reaction mixture.

The mixture is filtered to remove the precipitate of calcium fluoride and calcium carbonate and upon evaporation of the filtrate on a steam bath and oven drying at approximately 130° C., pure crystalline.

$$[Cl(C_2F_4)_{4.5}SO_3]_2Ca$$

is obtained. This calcium salt is remarkably soluble in water, a saturated aqueous solution thereof at room temperature (25° C.) containing about 20% salt by weight.

The zinc salt $[Cl(C_2F_4)_{4.5}SO_3]_2Zn$, may be prepared from the calcium salt by the addition of the calculated amount of zinc sulfate $(ZnSO_4)$ in aqueous solution to a hot (60-70° C.) aqueous solution of the calcium salt, the calcium precipitating out of solution as $CaSO_4$. This zinc salt is itself quite soluble in water, a saturated solution thereof at room temperature containing about 10% by weight of the zinc salt.

The potassium, lithium, ammonium and sodium salts, $$Cl(C_2F_4)_{4.5}SO_3K$$
$$Cl(C_2F_4)_{4.5}SO_3Li$$
$$Cl(C_2F_4)_{4.5}SO_3Na$$

on the other hand are relatively insoluble, the solubility of the potassium salt, for example, being only about 1% by weight.

These and other salts may be prepared by the same general procedure, namely by treatment of the calcium salt with the appropriate metal or ammonium sulfate.

When preparing a relatively insoluble salt, such as the potassium salt, the slurry containing said salt should be filtered while warm to remove the calcium sulfate. Then, upon cooling this filtrate, the pure salt crystallizes from the solution and may readily be filtered off and dried.

The corresponding sulfonic acid $$Cl(C_2F_4)_{4.5}SO_3H$$

is prepared by distillation from a mixture of the calcium or other salt and 100% sulfuric acid solution.

The sulfonyl chlorides $$Cl(C_2F_4)_nSO_2Cl$$

can be prepared by reacting the acid with $PCl_5$ or the salt with $PCl_5 \cdot 2ZnCl_2$ complex in approximately equal molar ratio.

The sulfonamides $Cl(C_2F_4)_nSO_2NH_2$ may be prepared by reacting the acid fluoride with liquid ammonia.

The acids, metal and ammonium salts, sulfonyl chlorides and fluorides (acid chlorides and fluorides) and sulfonamides are closely related and form a natural grouping in chemical classification. They can all be represented by the formula $$Cl(C_2F_4)_nSO_2A$$

$n$ being an integer of from 2 to about 150 and wherein A is an inorganic substituent representing a sulfur bonded hydroxy group (OH) in the case of acids, or a salt group (OM), (with the understanding that in the case of salts or polyvalent metals the metal atom may be joined to more than one sulfonyl group) or a fluorine (F) or chlorine (Cl) atom in the cases of acid fluorides or chlorides, or an amido group ($NH_2$) in the case of sulfonamides.

The salts and the acids are extremely stable. The acids are stronger, more soluble, much higher boiling, and less volatile than the corresponding perfluoro carboxylic acids. Both the acids and their salts are more stable than their corresponding perfluoro carboxylic counterparts, and are stronger and more stable than their hydrocarbon sulfonic counterparts.

The omega-chloroperfluoroalkanesulfonic acids and derivatives have utility as surface active agents and as starting materials for making surface active compounds. Although the omega-chloro-substituent on the otherwise completely fluorinated "tail" renders these compounds markedly less oil resistant than their corresponding analogs having completely fluorinated tails, the omega-chloro-compounds nevertheless are only slightly soluble in hydrocarbons, oils and carbon tetrachloride and are useful to reduce the surface tension of aqueous and non-aqueous solutions where the higher volatility and/or lower solubility of the corresponding completely fluorinated compounds render them unsuitable.

Specifically, the omega-chloro-perfluoroalkanesulfonic acids and derivatives of this invention have utility (depending on the particular system) as wetting agents, foaming agents, emulsifying agents, dispersing agents, detergents, corrosion inhibitors, fluxes and as surface treating and coating agents.

Having thus described the invention, what is claimed as new is as follows:

We claim:

1. The omega-chloro-perfluoro alkanesulfonic acids represented by the formula $$Cl(C_2F_4)_nSO_3H$$

wherein $n$ is an integer from about 2 to about 150, and the corresponding metal and ammonium salts, acid fluorides, acid chlorides and sulfonamides.

2. The omega-chloro-perfluoroalkanesulfonyl fluorides corresponding to the formula $$Cl(C_2F_4)_nSO_2F$$

wherein $n$ is an integer from about 2 to about 150.

References Cited in the file of this patent

UNITED STATES PATENTS 2,276,097    Salzberg    Mar. 10, 1942
2,732,398    Brice et al.    Jan. 24, 1956

UNITED STATES PATENT OFFICE
CERTIFICATE OF CORRECTION

Patent No. 2,877,267                                             March 10, 1959

George Van Dyke Tiers et al.

It is hereby certified that error appears in the printed specification of the above numbered patent requiring correction and that the said Letters Patent should read as corrected below.

Column 4, line 16, for "or polyvalent" read -- of polyvalent --.

Signed and sealed this 22nd day of March 1960.

(SEAL)
Attest:

KARL H. AXLINE                                     ROBERT C. WATSON
Attesting Officer                                 Commissioner of Patents